US010760437B2

(12) United States Patent
Smith et al.

(10) Patent No.: US 10,760,437 B2
(45) Date of Patent: Sep. 1, 2020

(54) TURBOCHARGER WITH PORTED TURBINE SHROUD (71) Applicant: HONEYWELL INTERNATIONAL INC., Morris Plains, NJ (US)

(72) Inventors: William Joseph Smith, Gardena, CA (US); Ashraf Mohamed, Torrance, CA (US); Derek Cooper, Redondo Beach, CA (US)

(73) Assignee: GARRETT TRANSPORTATION I INC., Torrance, CA (US)

(*) Notice: Subject to any disclaimer, the term of this patent is extended or adjusted under 35 U.S.C. 154(b) by 246 days.

(21) Appl. No.: 15/398,982

(22) Filed: Jan. 5, 2017

(65) Prior Publication Data

US 2018/0094530 A1 Apr. 5, 2018

Related U.S. Application Data (60) Provisional application No. 62/402,490, filed on Sep. 30, 2016.

(51) Int. Cl.
F01D 9/02 (2006.01)
F01D 17/12 (2006.01)
(Continued)

(52) U.S. Cl.
CPC ............ F01D 9/026 (2013.01); F01D 5/04 (2013.01); F01D 17/12 (2013.01); F01D 17/145 (2013.01);
(Continued)

(58) Field of Classification Search
CPC . F01D 9/026; F01D 5/04; F01D 5/043; F01D 17/12; F01D 17/105; F01D 17/141;
(Continued)

(56) References Cited

U.S. PATENT DOCUMENTS 3,994,620 A * 11/1976 Spraker, Jr. ........... F01D 17/105
415/145
4,445,815 A * 5/1984 Fortmann ............. F01D 15/005
415/12
(Continued)

FOREIGN PATENT DOCUMENTS

CZ 201500565 A3 5/2017
DE 19924228 A1 12/2000
(Continued)

OTHER PUBLICATIONS

Extended EP Search Report for Application No. 17192498.8-1006 dated Jan. 25. 2018.

Primary Examiner — Ninh H. Nguyen
Assistant Examiner — Eric J Zamora Alvarez
(74) Attorney, Agent, or Firm — Lorenz & Kopf, LLP (57) ABSTRACT A turbocharger includes a turbine housing that defines a flow passage for a fluid. The turbine housing includes a turbine shroud member. The turbocharger also includes a turbine wheel supported for rotation within the turbine housing relative to the turbine shroud member. The turbine wheel is configured to rotate as the fluid flows through the flow passage. Moreover, the turbocharger includes a port extending through the turbine shroud member. The port is configured to receive a portion of the fluid flowing through the flow passage.

11 Claims, 5 Drawing Sheets (51) Int. Cl.

| | |
|---|---|
| *F02C 6/12* | (2006.01) |
| *F01D 17/14* | (2006.01) |
| *F01D 25/24* | (2006.01) |
| *F02B 33/40* | (2006.01) |
| *F02B 37/18* | (2006.01) |
| *F01D 17/10* | (2006.01) |
| *F01D 25/30* | (2006.01) |
| *F01D 5/04* | (2006.01) |

(52) U.S. Cl.
CPC .............. *F01D 25/24* (2013.01); *F02B 33/40* (2013.01); *F02B 37/18* (2013.01); *F02C 6/12* (2013.01); *F01D 17/105* (2013.01); *Y02T 10/144* (2013.01)

(58) Field of Classification Search
CPC ...... F01D 17/145; F01D 25/24; F01D 17/143; F01D 17/167; F02B 33/40; F02B 37/18; F02B 37/183; F02B 37/025; F02C 6/12; F02C 9/18; F05D 2220/40; F04D 27/4213; F04D 29/667; F04D 29/4206; F04D 2260/606
USPC ........................................................ 415/144
See application file for complete search history.

(56) References Cited

U.S. PATENT DOCUMENTS

| | | | | |
|---|---|---|---|---|
| 5,855,117 | A * | 1/1999 | Sumser | F01D 17/143 |
| | | | | 415/158 |
| 5,863,178 | A * | 1/1999 | Scheinert | F01D 25/30 |
| | | | | 415/58.4 |
| 7,272,929 | B2 * | 9/2007 | Leavesley | F01D 17/167 |
| | | | | 415/158 |
| 8,037,683 | B2 * | 10/2011 | Wirbeleit | F01D 17/12 |
| | | | | 60/602 |
| 8,191,368 | B2 * | 6/2012 | Garrett | F01D 17/143 |
| | | | | 415/157 |
| 8,209,982 | B2 * | 7/2012 | Sumser | F01D 9/026 |
| | | | | 123/562 |
| 9,957,882 | B2 * | 5/2018 | Kemmerling | F02B 37/183 |
| 2003/0014972 | A1 | 1/2003 | Arnold | |

FOREIGN PATENT DOCUMENTS

| | | |
|---|---|---|
| EP | 2894297 A2 | 7/2015 |
| GB | 2319304 A | 5/1998 |
| WO | 2012095212 A1 | 7/2012 |

\* cited by examiner

TURBOCHARGER WITH PORTED TURBINE SHROUD

CROSS REFERENCE TO RELATED APPLICATION

This application claims the benefit of U.S. Provisional Application No. 62/402,490, filed Sep. 30, 2016.

TECHNICAL FIELD

The present disclosure generally relates to a turbocharger and, more particularly, to a turbocharger with a ported turbine shroud.

BACKGROUND

Turbochargers typically include a turbine section with a housing and a turbine wheel rotatably supported in a flow passage of the housing. The turbine wheel rotates as a fluid (e.g., exhaust gas) flows through the flow passage of the housing.

The performance of the turbine section may be expressed in terms of efficiency as a function of flow at a given expansion ratio. Typically, the turbine exhibits high efficiency at a particular volumetric flow rate, and as the flow deviates from this flow, the efficiency is negatively impacted. At the same time, the efficiency of turbines has a relationship with the amount of flow a turbine can pass for a specific external diameter and throat area (minimum geometric area in the passage between adjacent turbine blades) of the turbine wheel. Generally speaking, there is a nominal flow capacity beyond which the maximum efficiency is compromised. Together, this means that there is a maximum flow capacity a turbine can deliver at a given expansion ratio for a targeted efficiency level for a given turbine wheel size.

However, it may not be possible to increase the turbine wheel size to allow for a desired flow capacity for a given efficiency target. For example, increasing the turbine wheel size may cause the turbocharger to be too bulky for a particular vehicle.

Accordingly, it is desirable to provide a turbocharger with a relatively small turbine wheel that provides increased efficiency at a relatively high flow rate and that ultimately increases efficiency at that flow condition. Other desirable features and characteristics of the present disclosure will become apparent from the subsequent detailed description and the appended claims, taken in conjunction with the accompanying drawings and this background discussion.

BRIEF SUMMARY

In one embodiment, a turbocharger is disclosed that includes a turbine housing. The turbine housing defines a flow passage for a fluid. The turbine housing includes a turbine shroud member. The turbocharger also includes a turbine wheel supported for rotation within the turbine housing relative to the turbine shroud member. The turbine wheel is configured to rotate as the fluid flows through the flow passage. Moreover, the turbocharger includes a port extending through the turbine shroud member. The port is configured to receive a portion of the fluid flowing through the flow passage.

In another embodiment, a turbine section of a turbocharger is disclosed that includes a turbine housing defining a flow passage for a fluid. The turbine housing includes a turbine shroud member. The turbine section further includes a turbine wheel supported for rotation within the turbine housing relative to the turbine shroud member. The turbine wheel is configured to rotate as the fluid flows through the flow passage. The turbine wheel includes a blade with a leading edge, a trailing edge, and an outer edge that extends between the leading and trailing edges. The outer edge opposes an inner shroud surface of the turbine shroud member. Additionally, the turbine section includes a port extending through the turbine shroud member. The port is configured to receive a portion of the fluid flowing through the flow passage. The port includes an inlet that extends through the inner shroud surface. The inlet is disposed relative to the turbine wheel between the leading edge and the training edge of the blade.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbocharger with improved flow characteristics. In particular, example embodiments include a turbocharger with a turbine section having a turbine shroud with a port. A portion of the flow through the turbine section may be received within the port. Accordingly, the ported turbine shroud may allow a desired flow capacity for a given efficiency target. Also, the ported turbine shroud may increase efficiency at a relatively high flow rate. Furthermore, the ported turbine shroud may increase the total flow capacity and when the turbine wheel is operating in a choke condition. Moreover, the turbine section may allow for high flow rates using a relatively small turbine wheel; therefore, the turbine section may be fairly compact. Additional details of the present disclosure will be discussed below.

Figure 1:
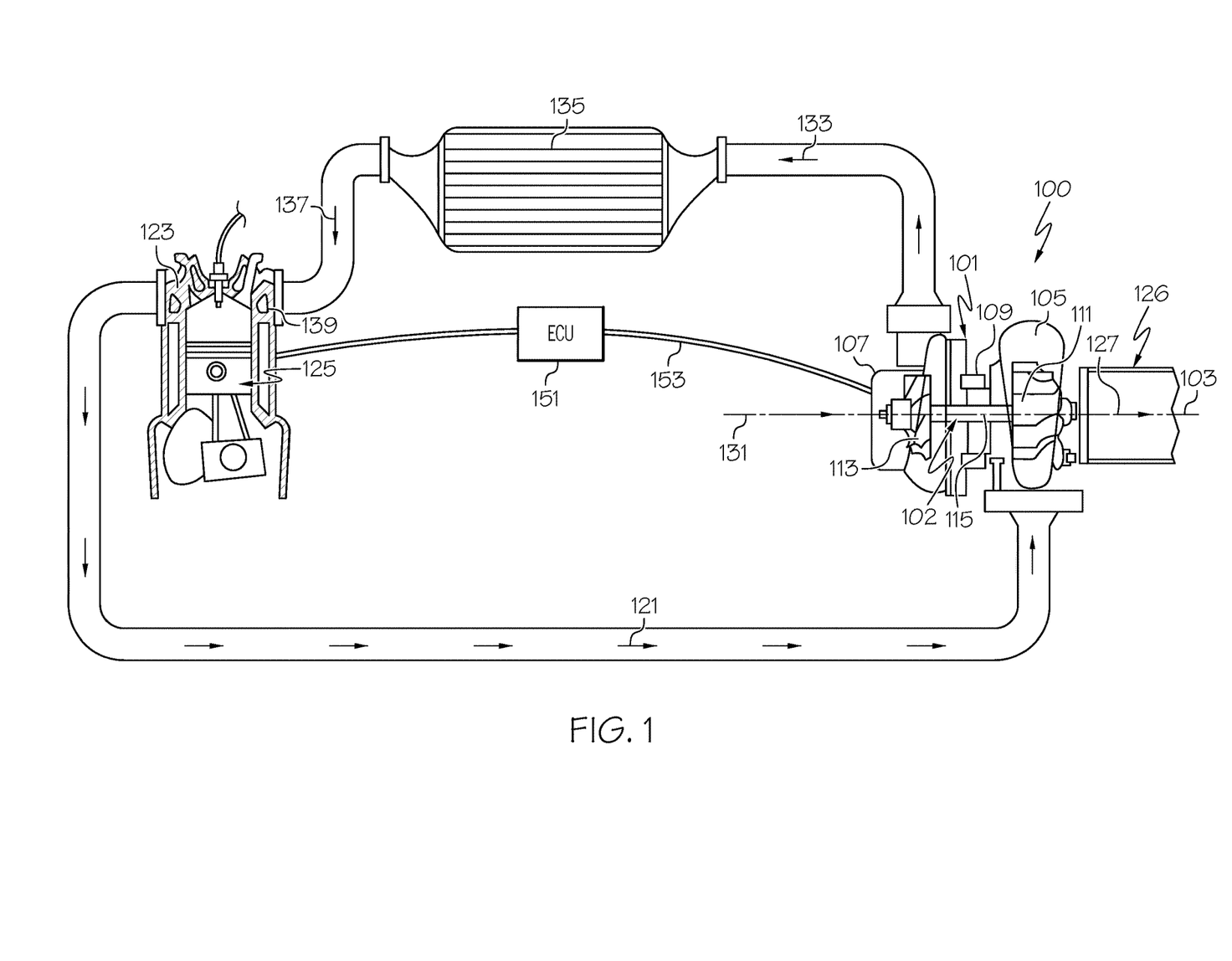
FIG. 1 is a schematic view of a turbocharger of a vehicle, which is connected to an engine and an intercooler according to example embodiments of the present disclosure.

FIG. 1 is a schematic view of a turbocharger 100 that includes a turbocharger housing 101 and a rotor 102. The rotor 102 is configured to rotate within the turbocharger housing 101 about an axis of rotor rotation 103. The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis of rotation 103, through the bearing housing 109, to connect the turbine wheel 111 to the compressor wheel 113. Accordingly, the turbine wheel 111 and the compressor wheel 113 rotate together about the axis 103.

It will be appreciated that the turbocharger 100 may have one of a variety of configurations that may or may not correspond with the illustrated embodiment. For example, the turbine wheel 111 may be configured as a radial, axial, or mixed turbine wheel. Also, the turbocharger 100 may be configured with a wastegate, a variable nozzle, or other features.

The turbine housing 105 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 (and thus the rotor 102) is driven in rotation around the axis 103 by the high-pressure and high-temperature exhaust gas stream 121, which becomes a lower-pressure and lower-temperature exhaust gas stream 127 and is axially released into an exhaust system 126. In other embodiments, the engine 125 may be of another type, such as a diesel fueled engine.

The compressor housing 107 and compressor wheel 113 form a compressor stage. The compressor wheel 113, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature, over that of the input air.

In some embodiments, the pressurized air stream 133 may be channeled through an air cooler 135 (i.e., intercooler), such as a convectively cooled charge air cooler. The air cooler 135 may be configured to dissipate heat from the pressurized air stream 133, increasing its density. The resulting cooled and pressurized output air stream 137 is channeled into an intake manifold 139 on the internal combustion engine 125, or alternatively, into a subsequent-stage, in-series compressor. The operation of the system is controlled by an ECU 151 (engine control unit) that connects to the remainder of the system via communication connections 153.

Figure 2:
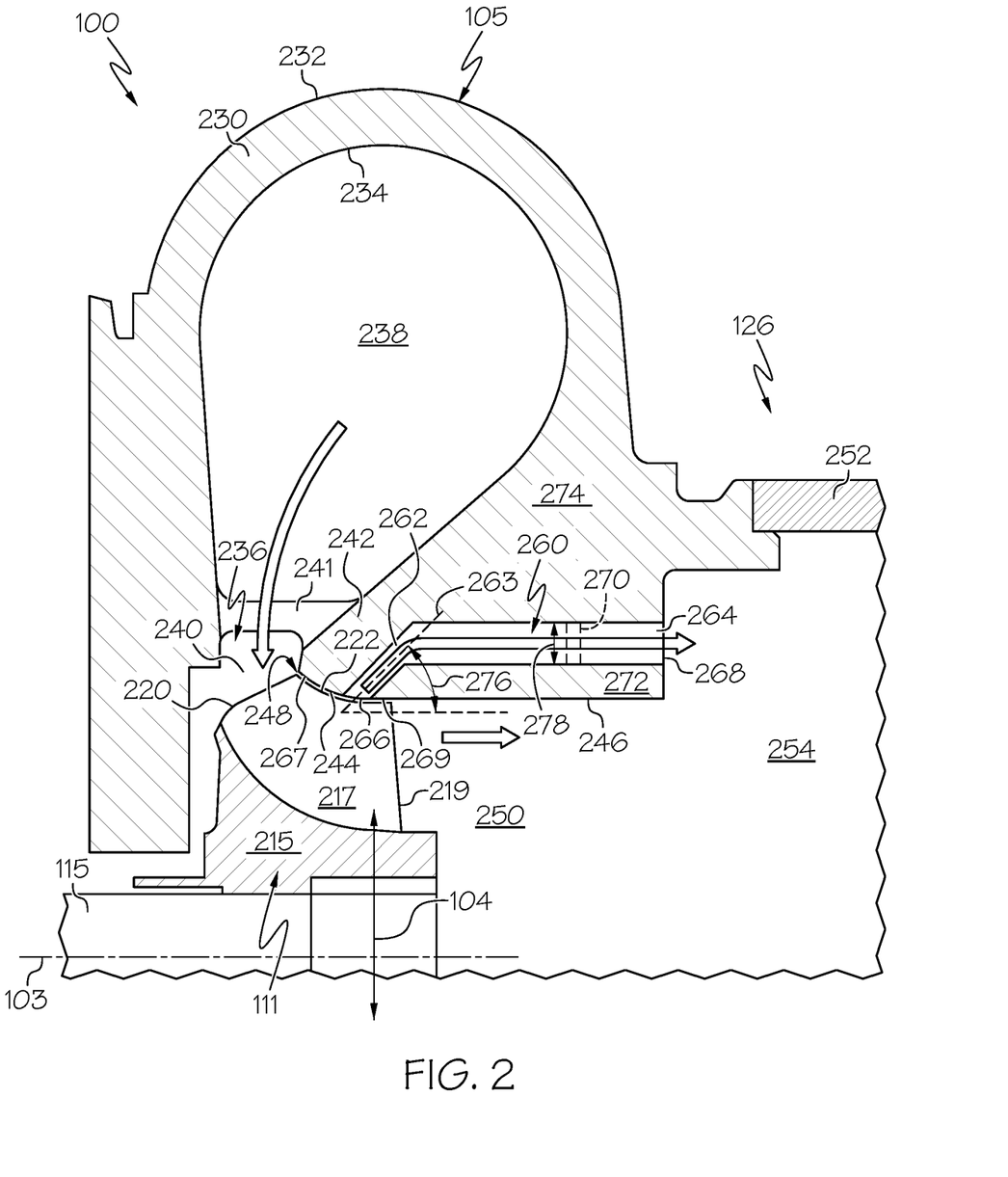
FIG. 2 is a cross section of a turbine section of the turbocharger of FIG. 1 according to example embodiments of the present disclosure.

Referring now to FIG. 2, a cross section of an area of the turbocharger 100 is shown. The cross section is taken along the axis 103, and portions of the turbine housing 105, the turbine wheel 111, and other adjacent structures are shown. A radial axis 104, which extends normal to the axis of rotation 103, is also shown for reference purposes.

The turbine wheel 111 includes a hub 215 and plurality of blades 217, one of which is shown. Each blade 217 may include a leading edge 220, a trailing edge 219, and an outer edge 222. The outer edge 222 may extend between and intersect both the trailing edge 219 and the leading edge 220. The outer edge 222 may be curved in some embodiments.

Also, the turbine housing 105 may include an outer wall 230 with an exterior surface 232 and an interior surface 234. The turbine housing 105 may also include a shroud member 242. The shroud member 242 may be generally annular and may be attached (e.g., integrally attached) with the outer wall 230 in some embodiments. Also, the shroud member 242 may extend annularly about the axis of rotation 103 and may surround (i.e., encompass, encircle, etc.) the turbine wheel 111. An internal shroud surface 244 may oppose (i.e., face) the outer edge 222 of the blade 217. Also, the curved shape of the internal shroud surface 244 may be inverse to the curved shape of the outer edge 222 of the blade 217. Moreover, an internal downstream surface 246 of the shroud member 242 may extend away from the internal shroud surface 244. In some embodiments, the downstream surface 246 may be substantially parallel to the axis of rotation 103.

In some embodiments, the turbine housing 105 may be a unitary, one-piece member such that the shroud member 242 and the outer wall 230 are integrally attached and monolithic. Additionally, in some embodiments, the turbine housing 105 may be formed substantially by casting methods. In additional embodiments, the turbine housing 105 may be formed via additive manufacturing (e.g., 3D printing) methods. Further embodiments may include a separate shroud member manufactured by various methods (e.g. casting, machining, 3D printing), wherein the shroud member is mechanically coupled to the turbine housing.

The interior of the turbine housing 105 may define a flow passage 236 extending, at least, through the turbine section of the turbocharger 100. In some embodiments, the flow passage 236 may be collectively defined by a spiral volute portion 238, an inlet passageway 240, a blade passageway 248, and an outlet passageway 250, each of which will be discussed in detail below.

Specifically, the internal surface 234 may define the spiral volute portion 238 as well as the inlet passageway 240 disposed radially inward of the volute portion 238. The inlet passageway 240 may be fluidly connected to the volute portion 238 so as to receive flow therefrom. In some embodiments, the inlet passageway 240 may extend radially (i.e., parallel to a radial axis 104) toward the axis of rotation 103. Additionally, the inlet passageway 240 may include a vane 241 disposed therein.

Furthermore, the internal shroud surface 244 may define the blade passageway 248. Technically, the blade passageway 248 may be defined between the internal shroud surface 244 and the outer edges 222 of the blades 217 of the turbine wheel 111. The blade passageway 248 may extend from the leading edge 220 to the trailing edge 219 of the blades 217. The blade passageway 248 may be a void that extends annularly about the axis 103. The blade passageway 248 may be fluidly connected to and downstream of the inlet passageway 240 so as to receive flow therefrom.

Additionally, the downstream shroud surface 246 may define the outlet passageway 250 that extends from the blade passageway 248. The outlet passageway 250 may be fluidly connected to the blade passageway 248 to receive flow therefrom. The outlet passageway 250 may extend downstream from the trailing edge 219 of the blades 217. Also, the outlet passageway 250 may be fluidly connected to the exhaust system 126. For example, an exhaust member 252 (e.g., exhaust pipe) may be connected to the turbine housing 105 such that an exhaust passage 254 of the exhaust member 252 receives flow from the outlet passageway 250. In other embodiments, the outlet passageway 250 may lead to a second turbine (not shown).

Furthermore, the turbine section of the turbocharger 100 may include a port 260. In some embodiments, the port 260 may be an annular opening in the turbine housing 105 with an inlet 266 that receives at least some flow from the flow passage 236. That flow may be directed through the port 260, away from the flow passage 236.

In some embodiments, the port 260 may extend through the shroud member 242. The port 260 may extend substantially in a direction along the axis 103 as shown in FIG. 2, and the port 260 may be annular so as to extend in a circumferential direction about the axis 103. In some embodiments, the port 260 may separate an inner annular portion 272 of the shroud member 242 from an outer annular portion 274 of the shroud member 242. Also, a strut 270 or other support member may extend across the port 260, between the outer and inner annular portions 272, 274 of the shroud member 242.

The port 260 may have one of a variety of cross sectional profiles without departing from the scope of the present disclosure. The port 260 may be located in a variety of locations within the shroud member 242. Also, the port 260 may have any suitable dimensions. For example, the port may have a width 278 (measured between opposing surfaces of the outer and inner annular portions 272, 274 of the shroud member 242). In some embodiments, the width 278 may vary along the longitudinal length of the port 260. In other embodiments, the width 278 of the port 260 may remain substantially constant along its length.

The inlet 266 may extend through the internal shroud surface 244 and may be disposed anywhere between the leading edge 220 and the trailing edge 219 of the blade 217, with respect to the axis 103. In the embodiment shown, for example, the inlet 266 is located approximately half way between the leading edge 220 and the trailing edge 219 relative to the axis 103. The inlet 266 may also separate an upstream portion 267 of the flow passage 236 from a downstream portion 269 of the flow passage 236. In other words, the upstream portion 267 of the flow passage 236 may be disposed upstream of the inlet 266, and the downstream portion 269 may be disposed downstream of the inlet 266. The location of the inlet 266 relative to the blade 217 may correspond to a known choke point in the path of the flow passage 236.

The inlet 266 may be defined by an inlet portion 262 of the port 260. The inlet portion 262 may extend along an axis 263 that is disposed at an angle 276 (an acute angle) relative to the axis 103. Thus, the inlet 266 may receive flow from the flow passage 236, and the inlet portion 262 may direct flow in both a radially outward and a longitudinal direction. Although the axis 263 of the inlet portion 262 is substantially straight in the embodiment shown, it will be appreciated that the axis 263 of the inlet portion 262 may curve in other embodiments without departing from the scope of the present disclosure.

The port 260 may also include a longitudinal portion 264. In some embodiments, the longitudinal portion 264 may be substantially parallel to the axis 103 and may be disposed at a substantially constant radial distance from the axis 103. The longitudinal portion 264 may be fluidly connected to the inlet portion 262 to receive flow from the inlet portion 262.

Accordingly, the longitudinal portion 264 may direct flow from the inlet portion 262 substantially along the axis 103. As shown in FIG. 2, the width 278 of the longitudinal portion 264 may be larger than the width 278 of the inlet portion 262.

Also, the port 260 may include an outlet 268. In some embodiments, the longitudinal portion 264 may define the outlet 268 of the port 260. The outlet 268 may be fluidly connected to the exhaust passage 254 of the exhaust member 252 such that the exhaust passage 254 receives flow from the port 260. Thus, in the embodiment of FIG. 2, the port 260 is fluidly connected directly to the exhaust passage 254 such that flow through the port 260 bypasses the downstream portion 269 and the outlet passage 250 of the flow passage 236.

Figure 3:
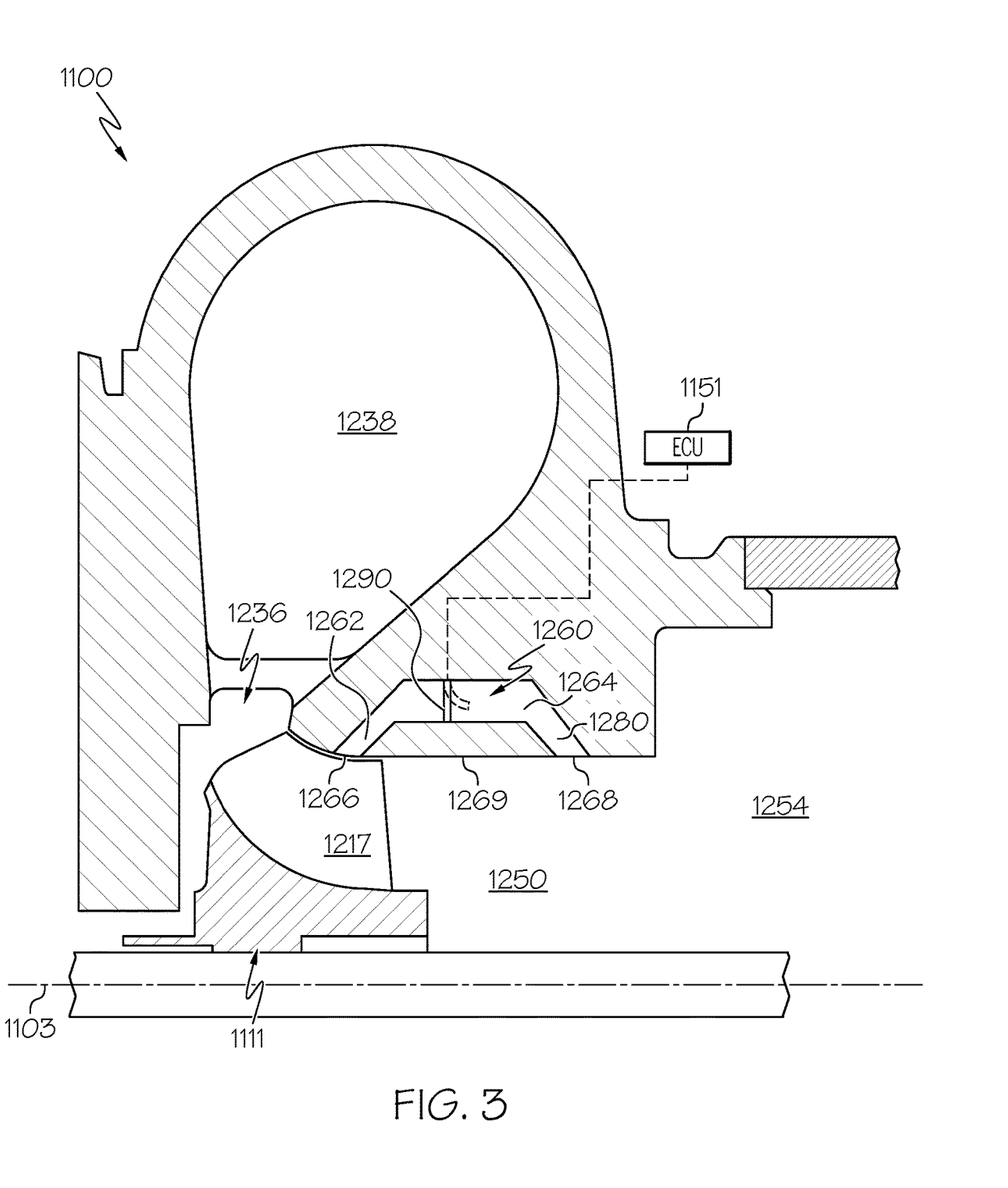
FIG. 3 is a cross section of the turbine section according to additional example embodiments of the present disclosure.

Additional embodiments are illustrated in FIG. 3. Components that correspond to those of FIG. 2 are indicated with corresponding reference numbers increased by 1000. As shown, the port 1260 may include the inlet portion 1262 and the longitudinal portion 1264. Also, the port 1260 may include a return portion 1280. The return portion 1280 may be fluidly connected to the longitudinal portion 1264, and the return portion 1280 may define the outlet 1268. The return portion 1280 may extend radially inward from the longitudinal portion 1264 toward the axis 1103 such that the outlet 1268 is in direct fluid communication with the downstream portion 1269 of the flow passage 1236. Thus, flow from the port 1260 may be received within the outlet passageway 1250 and may be ultimately received in the exhaust passage 1254.

Furthermore, in some embodiments, the turbocharger 1100 may include a valve member, which is schematically illustrated and indicated at 1290 in FIG. 3. Generally, the valve member 1290 may be configured to change flow through the port 1260. In some embodiments, for example, the valve member 1290 may be configured to move between a first position (shown with solid lines) and a second position (shown in phantom). In the first position (i.e., a closed position), the valve member 1290 may substantially block a majority of flow (e.g., stop all flow, seal off flow, etc.) through the port 1260. In the second position (i.e., an open position), the valve member 1290 may allow for more flow through the port 1260. In additional embodiments, the valve member 1290 may have one or more intermediate positions between the first and second positions, and flow rate through the port 1260 may be different at each intermediate position.

The valve member 1290 may have one of a variety of configurations without departing from the scope of the present disclosure. For example, the valve member 1290 may be received in the port 1260 in some embodiments and disposed between the inlet 1266 and the outlet 1268. In other embodiments, the valve member 1290 may be disposed at the inlet 1266 and may selectively open and close the inlet 1266. In further embodiments, the valve member 1290 may be disposed at the outlet 1268 and may selectively open and close the outlet 1268.

In some embodiments, the valve member 1290 may be in communication with a controller, such as the ECU 1151, for controlling the position of the valve member 1290. Specifically, in some embodiments, the valve member 1290 may have an actuator that actuates the valve member 1290 between its different positions. The ECU 1151 may receive input data, for example, from a sensor associated with the turbocharger 1100 or other vehicle system. Based on that input, the ECU 1151 may send a control signal to the actuator for actuating the valve member 1290. Accordingly, in some embodiments, flow through the port 1260 may be allowed (i.e., valve member 1290 in open position) under certain vehicle conditions, and flow through the port 1260 may be blocked (i.e., valve member 1290 in closed position) under other vehicle conditions.

Figure 4:
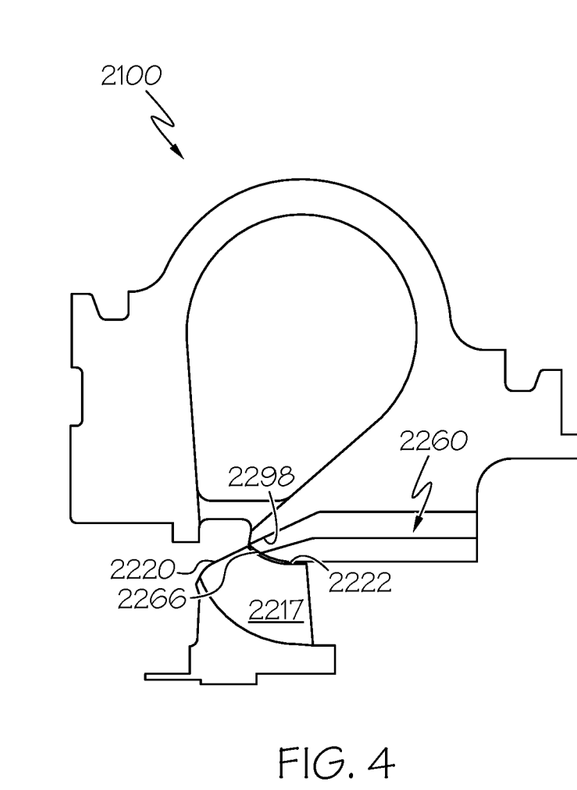
FIG. 4 is a cross section of the turbine section according to additional example embodiments of the present disclosure.

Referring now to FIG. 4, additional embodiments of the turbocharger 2100 are illustrated. Components that correspond to those of FIG. 2 are indicated with corresponding reference numbers increased by 2000. As shown, the port 2260 may include an inlet 2266 that is adjacent the leading edge 2220 of the blade 2217. An upstream end 2298 of the inlet 2266 may be substantially aligned with the leading edge 2220 in some embodiments as shown in FIG. 4. The outer edge 2222 of the blade 2217 may oppose other portions of the inlet 2266. This configuration may increase efficiency by preventing a choke point from developing proximate the leading edge 2220 of the blade 2217.

Figure 5:
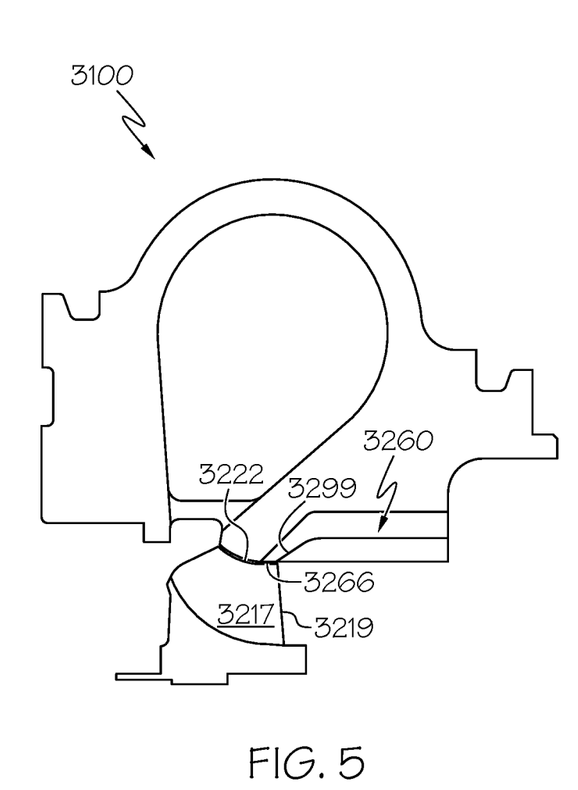
FIG. 5 is a cross section of the turbine section according to additional example embodiments of the present disclosure.

Referring now to FIG. 5, additional embodiments of the turbocharger 3100 are illustrated. Components that correspond to those of FIG. 2 are indicated with corresponding reference numbers increased by 3000. As shown, the port 3260 may include an inlet 3266 that is adjacent the trailing edge 3219 of the blade 3217. A downstream end 3299 of the inlet 3266 may be substantially aligned with the trailing edge 3219 in some embodiments as shown in FIG. 5. The outer edge 3222 of the blade 3217 may oppose other portions of the inlet 3266. This configuration may increase efficiency by preventing a choke point from developing proximate the trailing edge 3220 of the blade 3217.

Figure 6A:
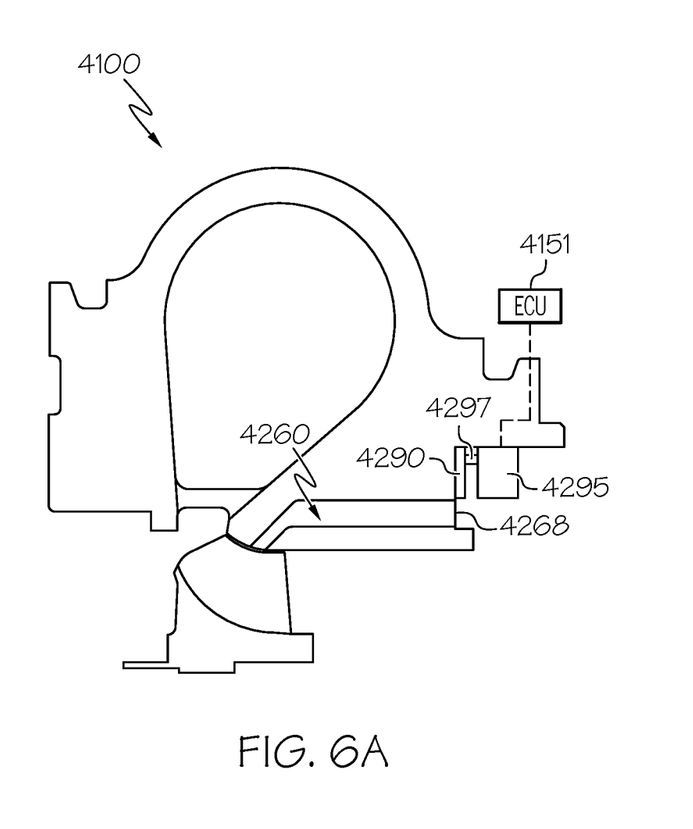
FIGS. 6A and 6B are cross sections of the turbine section according to additional example embodiments, wherein a valve member is shown in a first position in FIG. 6A and the valve member is shown in a second position in FIG. 6B.
Figure 6B:
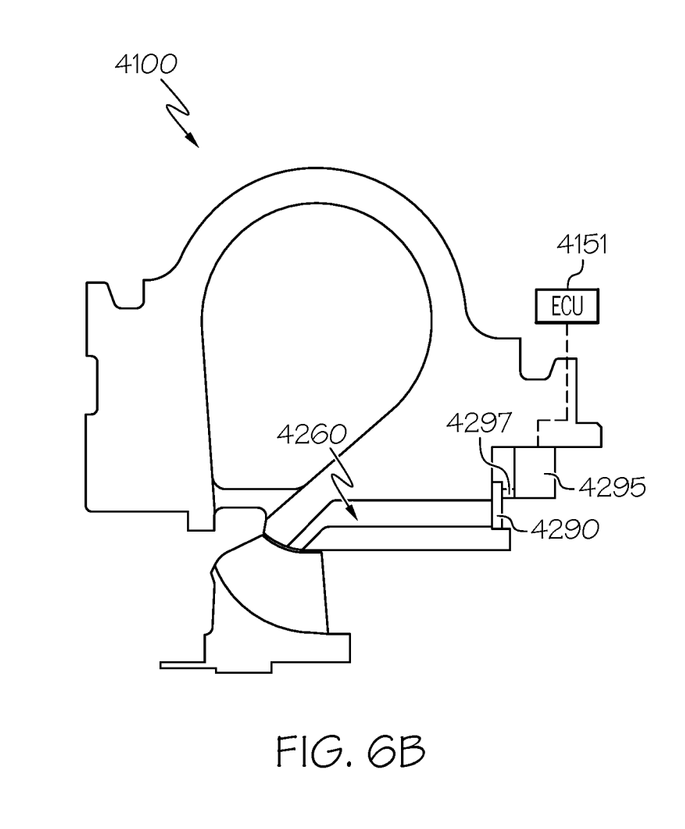

Referring now to FIGS. 6A and 6B, additional embodiments of the turbocharger 4100 are illustrated. Components that correspond to those of FIG. 2 are indicated with corresponding reference numbers increased by 4000. As shown, the valve member 4290 may be disposed proximate the outlet 4268 of the port 4260. Also, the valve member 4290 may be attached to an actuator 4295 via a linkage 4297. The actuator 4295 may be in communication with the ECU 4151 of the vehicle. As shown, the actuator 4295 may actuate the valve member 4290 between a first, open position (FIG. 6A) and a second, closed position (FIG. 6B). In the first position, there may be flow through the port 4260, and the in the second position, the flow through the port 4260 may be substantially prevented and cut off by the valve member 4290. In some embodiments, the actuator 4295 may actuate the valve member 4290 in a substantially radial direction when moving between the first and second positions. Additionally, in some embodiments, the actuator 4295 may be configured to actuate the valve member 4290 in one or more intermediate positions that are disposed between the first, open position (FIG. 6A) and the second, closed position (FIG. 6B).

Accordingly, the turbochargers of the present disclosure may include a port that extends through the shroud member. A portion of the flow through the turbine section may be received within the port and may allow a desired flow capacity for a given efficiency target. Also, the ported turbine shroud may increase efficiency at a relatively high flow rate. Furthermore, the ported turbine shroud may increase the total flow capacity and when the turbine wheel is operating in a choke condition. Moreover, the turbine section may allow for high flow rates using a relatively small turbine wheel; therefore, the turbine section may be fairly compact.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbine section of a turbocharger comprising:
   a unitary turbine housing defining a flow passage for a fluid, the turbine housing including an outer wall and a turbine shroud member, the outer wall at least partly defining a volute portion of the flow passage;
   a turbine wheel supported for rotation within the turbine housing relative to the turbine shroud member, the turbine wheel configured to rotate as the fluid flows through the flow passage;
   the turbine shroud member including a port extending therethrough, the port separating an inner annular portion of the shroud member from an outer annular portion of the shroud member, the port including an inlet configured to receive a portion of the fluid flowing through the flow passage; and
   the turbine shroud member including a strut that extends across the port between the inner annular portion and the outer annular portion, the strut being fixedly attached to the inner annular portion and the outer annular portion.

2. The turbine section of claim 1, wherein the turbine wheel is supported for rotation about an axis of rotation;
   wherein the turbine wheel includes at least one blade with a leading edge and a trailing edge;
   the inlet being disposed relative to the turbine wheel between the leading edge and the trailing edge of the blade.

3. The turbine section of claim 2, wherein the blade includes an outer edge that intersects the leading edge and the trailing edge;
   wherein the outer edge of the blade opposes an inner shroud surface of the turbine shroud member; and
   wherein the inlet extends through the inner shroud surface of the turbine shroud member.

4. The turbine section of claim 2, further comprising an exhaust member with an exhaust passage that is fluidly connected to the flow passage of the turbine housing; and
   wherein the exhaust passage is fluidly connected to the port to receive flow from the port.

5. The turbine section of claim 4, wherein the port includes a return portion that defines an outlet of the port;
   wherein the return portion is fluidly connected to the flow passage to return flow from the port back to the flow passage before flowing into the exhaust passage.

6. The turbine section of claim 5, wherein a radial axis is defined normal to the axis of rotation;
   wherein the port includes an inlet portion that extends from the flow passage at an angle to both the axis of rotation and the radial axis;
   wherein the port includes a longitudinal portion that extends from the inlet portion parallel to the axis of rotation; and
   wherein the longitudinal portion is disposed between the inlet portion and the return portion.

7. The turbine section of claim 4, wherein the flow passage includes an upstream portion and a downstream portion, the upstream portion being upstream of the inlet of the port, the downstream portion being downstream of the inlet of the port;

wherein the port is fluidly connected directly to the exhaust passage such that flow through the port bypasses the downstream portion of the flow passage.

8. The turbine section of claim 7, wherein a radial axis is defined normal to the axis of rotation;

wherein the port includes an inlet portion that extends from the flow passage at an angle to both the axis of rotation and the radial axis; and     wherein the port includes a longitudinal portion that extends from the inlet portion parallel to the axis of rotation.

9. The turbine section of claim 1, further comprising a valve member configured to change flow through the port.

10. The turbine section of claim 9, wherein the valve member is configured to move between a first position and a second position;

wherein the valve member, in the first position, allows flow through the port; and     wherein the valve member, in the second position, prevents flow through the port.

11. The turbine section of claim 1, wherein the turbine wheel has one of a radial configuration, an axial configuration, or a mixed flow configuration.

* * * * *